United States Patent [19]

Wesch et al.

[11] Patent Number: 4,762,746

[45] Date of Patent: Aug. 9, 1988

[54] FIRE-RETARDING LAMINATED ELEMENT AND A METHOD OF CONTROLLING EXPANSION OF EXPANDABLE, FIRE-RETARDING FOAMING-AGENT LAYERS

[75] Inventors: Ludwig Wesch, Heidelberg; Edgar Weiss, Neckarsteinach, both of Fed. Rep. of Germany

[73] Assignee: Odenwald-Chemie GmbH, Schonau/Heidelberg, Fed. Rep. of Germany

[21] Appl. No.: 76,016

[22] Filed: Jul. 21, 1987

Related U.S. Application Data

[63] Continuation-in-part of Ser. No. 749,109, Jun. 26, 1985, abandoned.

[30] Foreign Application Priority Data

Jun. 27, 1984 [DE] Fed. Rep. of Germany ....... 3423700

[51] Int. Cl.$^4$ .......................... B32B 3/26; B32B 5/22; B32B 27/38
[52] U.S. Cl. ............................. 428/305.5; 428/316.6; 428/317.5; 428/317.9; 428/319.3; 428/920; 428/921
[58] Field of Search ............... 428/305.5, 316.6, 317.5, 428/317.9, 319.3, 913, 920, 921; 52/232

[56] References Cited

U.S. PATENT DOCUMENTS

| | | | |
|---|---|---|---|
| 4,015,386 | 4/1977 | Cook . | |
| 4,122,203 | 10/1978 | Stahl | 428/921 |
| 4,268,581 | 5/1981 | De Bol | 428/921 |
| 4,455,396 | 6/1984 | Al-Tabaqchall et al. | 521/54 |
| 4,467,577 | 8/1984 | Licht | 428/921 |
| 4,529,467 | 7/1985 | Ward et al. | 428/921 |
| 4,530,877 | 7/1985 | Hadley | 428/920 |

FOREIGN PATENT DOCUMENTS

| | | | |
|---|---|---|---|
| 2124811 | 11/1972 | Fed. Rep. of Germany . | |
| 2631727 | 3/1977 | Fed. Rep. of Germany . | |
| 2704881 | 8/1977 | Fed. Rep. of Germany . | |
| 2712022 | 9/1977 | Fed. Rep. of Germany . | |
| 2731817 | 1/1978 | Fed. Rep. of Germany . | |
| 2828603 | 1/1979 | Fed. Rep. of Germany . | |
| 2817200 | 4/1979 | Fed. Rep. of Germany . | |
| 8033720 | 4/1981 | Fed. Rep. of Germany . | |
| 3141045 | 6/1982 | Fed. Rep. of Germany . | |
| 3042788 | 9/1982 | Fed. Rep. of Germany | 428/921 |
| 3217816 | 11/1983 | Fed. Rep. of Germany . | |
| 3244779 | 4/1984 | Fed. Rep. of Germany . | |
| 1084503 | 9/1967 | United Kingdom . | |
| 1231361 | 5/1971 | United Kingdom . | |
| 1312711 | 4/1973 | United Kingdom . | |
| 2012296 | 7/1979 | United Kingdom . | |
| 2071111 | 9/1981 | United Kingdom | 428/921 |

OTHER PUBLICATIONS

Kunstoffe, 1952, p. 452.

*Primary Examiner*—William J. Van Balen
*Attorney, Agent, or Firm*—Hopgood, Calimafde, Kalil, Blaustein & Judlowe

[57] ABSTRACT

A fire resistant fire-retarding laminate includes foaming-agent layers combined with at least one restricting layer, which restrains expansion of the foaming-agent layer under heat and fire exposure and improves the mechanical integrity of the composite without any substantial heat induced expansion of its own. Instead of glass or graphite fillers, special non-graphitic carbon fillers are used in fibrous or platelet-like form. Incompletely carbonized material amoung others can be used. Such fillers provide improved restraint on the expansion of the foaming-agent layer and cooperate to preserve its structural integrity.

13 Claims, 1 Drawing Sheet

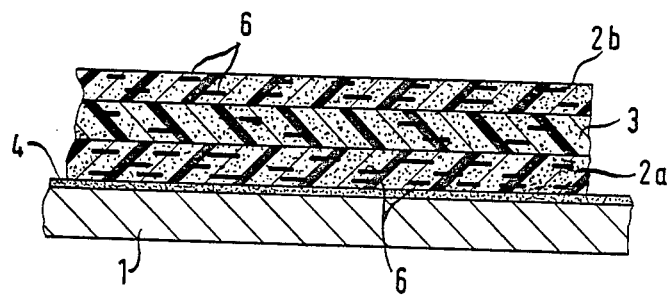
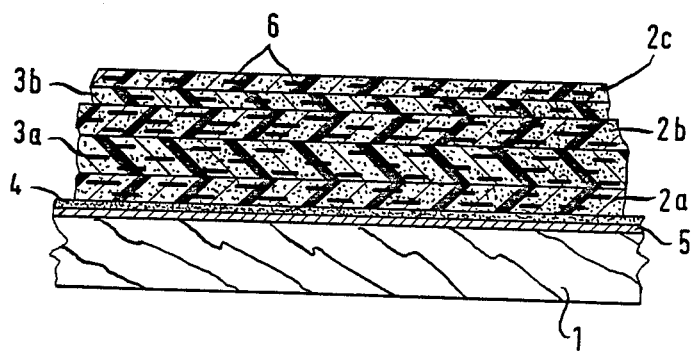

FIRE-RETARDING LAMINATED ELEMENT AND A METHOD OF CONTROLLING EXPANSION OF EXPANDABLE, FIRE-RETARDING FOAMING-AGENT LAYERS

BACKGROUND OF THE INVENTION

This application is a continuation-in-part of application Ser. No. 749,109, filed June 26, 1985, now abandoned. The invention is directed to a fire-retarding laminated element and to a method of fabricating a fire-retarding laminated element.

A fire-retarding laminated element of the general kind to which the present invention is directed is described in British patent application No. 2,071,111A corresponding to German DE-OS No. 3 042 788. A laminate is described therein wherein foaming-agent layers alternate with further layers referred to as barrier layers, which are intended to prevent the formation of cracks through the laminated element.

Although such fire-retarding laminated elements have already proved satisfactory because they are capable for some considerable time, for instance for 30 to 60 minutes, of preventing flame from a fire from penetrating, difficulties will sometimes arise when strong currents of air or other mechanical forces act on the foaming agent layer. In spite of efforts to solve the foregoing problem by configuring the foaming-agent layer in the form of a laminate of numerous single layers separated by glass fibre-containing barrier layers, the drawbacks have not yet been eliminated. It is therefore an object of the present invention to provide a fire-retarding laminated element of this general nature, which exhibits a still better fire-retarding effect even when subjected to external forces especially of a mechanical kind.

SUMMARY OF THE INVENTION

The invention resides in that the further layers are constructed as restricting layers which impede or restrain expansion of the foaming-agent layers in a controllable manner. The restricting layers consist at least partially of carbon in the form of fibres, flake-like fillers, platelet-like fillers, or combinations thereof, but specifically excluding graphite. The invention is based on the discovery that foaming-agent layers of the known kind may expand very unevenly, whereby sometimes even large cavities are formed. The formed carbon structure is frequently so weak as to crumble so that the heat insulating effect is partially lost. By virtue of the invention, however, the uncontrolled expansion of the foaming-agent layer per se is "restrained", as it were, in such a way that instead of large cavities finer foam structures of smaller pore size will be formed. Moreover, the foaming-agent layer is hindered to increase its thickness as much as it would without a restricting layer. Especially, by forming a pile of pairs of a retarding layer and of a foaming-agent layer, one upon the other, relatively "hard structures" with relatively small-sized pores can be formed, which do not easily crumble even when subjected to strong gusts of air or other shocks.

Surprisingly, the structure of the present invention, wherein the retarding layers preferably have an as manufactured thickness of between about one to three times the thickness of the associated foaming-agent layer, resists flames much longer than expected.

The term "restricting" in defining the auxiliary layers is intended to describe the function of restricting substantially the ability of the foaming-agent layers to increase their thicknesses in case of high temperature by foaming due to forming gases. If, for instance, a foaming-agent layer is connected and covered with the restricting layer according to the present invention, the foaming-agent can only increase its thickness up to about 60% of the final thickness which would be reached at the same temperature and after the same time without the restricting layer. For this reason the amount of increase of the thickness of the foaming-agent layer can be controlled by the amount of the fillers and/or by the thickness of the restricting layers. It has been found that a flame test results in a longer time period of resistance against fire in spite of less thickness of the complete laminated element. While a combination of such layers comprising prior art glass fibres resists for about 60 minutes, the same combination containing isotropic pitch-based carbon fibres instead of the glass fibres resists for about 95 minutes due to smaller pores and due to the specific skeleton of carbon.

These time values are based upon tests in a small furnace according to German industrial standards DIN 4102 part 8 with counterheating. In case of a free radiation of heat behind a steel plate covered with the respective coating on the front side thereof it is possible to reach "times of fire protection" of between 2 and 3 hours (without counter-heating).

It is recommended to provide the restricting layer with fibrous and/or flake-like fillers of carbon selected from the group consisting of isotropic pitch-based carbon, intermediate modulus (IM) carbon, high tenacity (HT) carbon, high strain (HST) carbon, pre-ox carbon and carbon black. High modulus (HM) carbon fibres (also called graphite fibres) do not solve the problem so well. Such preferred forms of carbon ensure the forming of a "skin" in cooperation with a rapid formation of a carbon skeleton in case of fire. Carbonization is promoted by the addition of melamines. Moreover, it is also possible to use other fillers such as carbonates or hydroxides of magnesium and calcium or the oxides thereof, and silicates or glass but the particular carbon particles form "nuclei" for the flame induced carbon skeleton.

According to the present invention specific carbon fillers, in particular non-graphitic carbon fibres, fulfill the conditions much better than graphite fibres which are classified as HM (high modulus) carbon fibres. The results depend on the cooperation between the particular form of the carbon fillers and of the plastic binders. In this regard optimum results are obtained when epoxy resins and isotropic carbon, in particular isotropic pitch-based carbon is used.

However, also high strain (HST) carbon, e.g., HST 1.8-fibres can be utilized.

About the same results are obtained if high tenacity (HT) carbon is used. Good results can be expected if HT 560 carbon fibres or HT 500 carbon fibres are utilized. Also HT 450 carbon fibres and HT 360 fibres are better than high modulus (HM) fibres (graphite fibres).

This is important in order to avoid that the combination of the carbon fillers and of the epoxy resin matrix delaminates which delaminating effect often results from high temperatures and stresses occurring between different layers and in particular between the substrate of e.g. metal or wood on the one hand and the fire-retarding laminate.

The various carbon fibers preferred for the present invention are contrasted with graphite fibers, the "HM" series, in the following table.

TABLE

| Fibre Code | Density g/cm | E-Modulus kN/mm | Tensile Strength N/mm | Rupture elasticity (breaking elongation) % |
| --- | --- | --- | --- | --- |
| HM 50 | 1.9 | 500 | 1750 | 0.35 |
| HM 40 | 1.8 | 400 | 2000 | 0.8 |
| HM 30 | 1.8 | 300 | 2400 | 0.8 |
| HT 300 | 1.0 | 240 | 3000 | 1.25 |
| HT 360 |  | 230 | 3600 | 1.6 |
| HT 350/400 | 1.7 | 240 | 3600 | 1.5 |
| HT 500 |  | 240 | 5000 | 2.3 |
| HT 560 |  | 280 | 5600 | 2.1 |
| HST 1.8 | 1.8 | 240 | 4400 | 1.8 |
| HST 2.0 | 1.8 | 240 | 4800 | 2.0 |
| IM 1.5 | 1.7 | 280 | 4400 | 1.5 |

HM High Modulus
HST High Strain
HT High Tenacity
IM Intermediate Modulus

From this table it is clear that the E-modulus of the HT-, HST- and IM-fibres utilized according to the present invention is lower than 300 kN/mm while the tensile strength is above 2.8 kN/mm, preferably above 3 kN/mm and the breaking elongation is above 1% preferably above 1.25%.

Pre-ox carbon fibres are incompletely carbonized fibres when mixed with the binder or base resin. Pre-ox fibres are fibres comprising more than 50% by weight carbon particularly between 50 and 80% carbon and between 5 and 20% by weight oxygen. Such pre-ox fibres are not based on pitch. They are produced from polyacrylnitril or copolymers therewith which is heated at a temperature of about 300° C. in an atmosphere containing oxygen in order to stabilize the structure of the fibres for further carbonization when confronted by the higher temperatures of fire or flames e.g., more than 1000° C. Such pre-ox fibres, therefore, are not yet fully carbonized when used as fillers according to the present invention. The pre-ox fibres do not comprise high modulus graphitic fibres and they are much cheaper than graphite fibres. Surprisingly, they are highly qualified to be used as fillers for the restricting layers. Fibre-diameters of less than 100 micrometers and fibre lengths of between 100 micrometers and 10 mm are preferred. Although it is known to use pre-ox fibres for single layer ablation coatings of aircraft cells from which rockets are fired, it is surprising that they well fulfill the conditions of the present invention in connection with foam-forming ingredients in connection with a multiple of different layers including foaming-agent layers. Moreover, such fibres can also be used as fillers for foaming-agent layers of laminations which do change their thickness in case of fire.

In a further method step, such fibres can be carbonized by for example heating at temperatures up to about 1600° C. in nitrogen so that HT- and HST-carbon fibres are formed which are not yet graphite fibres. Such fibres should not be fully carbonized compared with graphite fibres when used for mixing with the other substances of the layers.

Good results are obtained if SPO-Type carbon fibres of the German Company SIGRI are utilized. Very good results are obtained by using SF C 6 carbon fibres, pre-ox carbon fibres having lengths between 3 and 9 mm at an average of 6 mm. They are fabricated on a polyacryl base.

Accordingly, with an alternative method of the invention the object is solved in that foaming-agent layers capable of expanding at high temperatures are "loaded" with restricting layers of a type that are substantially non-expandable at the high temperatures that are responsible for the expansion of the foaming-agent layers, but which restrains the uncontrolled expansion of the foaming-agent layers and imparts to the laminate combination a rigidity or stability of a desired thickness which is effective over a relatively long period of time in case of high temperatures, especially in case of fire.

Very good results are obtained if, between two to five Pairs of foaming-agent layers and restricting layers are combined to form a tandem of especially 3 pairs.

Further configurations of the invention are explained in the following description including the description of the figures.

The fibres should be very fine, preferably they should have a thickness of 6–15 micrometers and a length of about 2–6 mm. For special purposes, it is also possible to use so-called micro-balloons or flakes.

While the foaming-agent layers have an average thickness of 0.5 to 3 mm, every restricting layer for restricting expansion should have a thickness between 1 and 4 mm.

Whereas the non-expanding restricting layers in case of fire will expand by at most 5–10 mm, the foaming-agent layer itself will expand by 10–20 cm in the uncontrolled state, but by virtue of the control through the non-expanding restricting layer it will expand only by about half that amount and less. That means the restricting layer limits further expansion of the foaming-agent after it has reached between about 30 to 50% of its otherwise fully expanded condition.

BRIEF DESCRIPTION OF THE DRAWINGS

Embodiments of the invention will be explained in detail with reference to the drawing.

The FIGS. 1 and 2 are schematic partial sectional views of laminated elements.

DETAILED DESCRIPTION OF THE PRESENTLY PREFERRED EMBODIMENTS

As shown in FIG. 1, to the base 1 to be protected, which may have applied thereto a primer layer 4, and in the case of steel an anti-corrosive polyvinylbutyrol layer 5, there is initially applied a restricting layer 2a and subsequently a foaming-agent layer 3, which is covered by a second restricting layer 2b. The primer layer 4 is also prevented from expansion by the restricting layer 2a. Both layers 4 and 2a are at the same time intended as protective layers in case of damage to the foaming-agent layer 3 by external influences such as falling objects or splashed water in case of a fire. The mechanical quality of the layer still permits part of the primer layer 4 to expand further even if the layers 2b and 3 are missing. This ensures fire protection for a further period of time.

As illustrated in FIG. 2, the laminated body is further improved. In all cases where rapid expansion should take place at low temperatures, and initial protection of the base 1—in this case wood covered with plate 5—is to be provided, the foaming-agent layer 3b and the restricting layer 2a are applied while the other layers 2a, 3a, 2b have the same function as described above. However, the foaming-agent layer 3b and the restricting layer 2a are thinner so as to promote initial expansion. At the same time they prevent too high and too rapid strains on the main foaming-agent layer 3a; together with the restricting layers this is responsible for a more uniform formation of the required fine pores without big pores.

With this arrangement there results a further advantage, because the restricting layer 2b has a dual function, viz., an expansion restraining or restricting effect on the adjacent foaming-agent layers 3a, 3b. The restricting layer 2a has a corresponding dual function. The restricting layers 2a, 2b, 2c are provided with fibres, flake-like or platelet-like fillers 6.

In case of fire there will always result strong, vitreous-like hard layers of considerable stability to external influences. All outer restricting layers, i.e., 2b and 2c, may also be terminated by a protective layer which should especially be water-repellent and should also be effective against nuisance. Suitable materials are polyurethanes of every kind, mainly polyesters of adipic acid, phthalic acid, triol and diol 80% in ethylene glycol acetate together with aromatic diisocyanate mixtures (Desmodur VPKL Bayer A.G.).

Below, the compositions of the various layers shall be described, wherein it is to be noted that the method may be performed with all fire protection systems of different base products and that also the type of the base products may differ from one layer to the next.

EXAMPLE 1

1. The restricting layers 2a, 2b, 2c are composed as follows:
   Component A:
   (a) VE 3100/SE/A (epoxy resin emulsion of Rütgerswerke AG): 100 parts by weight
   (b) MF 910 (non-plasticated fully alkoxilated melamine resin of Hoechst AG): 10 parts by weight
   (c) Antiblaze 78 (chlorophosphoric ester of Mobil Oil AG): 15 parts by weight
   (d) mica: 4.5 parts by weight
   (e) titanium RD 2: 4.5 parts by weight
   (f) isotropic pitch-based carbon fibres PC/106 T of SIGRI: 10 parts by weight Initially, the liquid products are mixed and subsequently the solid ingredients are added, the carbon fibres being slowly added by means of D dissolver.

To every 1 kg of the mixture there are subsequently added by means of dissolver 200 g of mica and 30 g of Aerosil R 805 as well as 100G of ethanol or another solvent.

Component B:
   (a) VE 3100/SE/B (adduct hardener of Rütgerswerke AG): 40 parts by weight
   (b) S 3111 (hardener system of Odenwald Chemie GmbH): 30 parts by weight
   (c) isotropic pitch-based carbon fibres PC/106 T of SIGRI: 10 parts by weight To 1 kg of component B there are further added 30 g of Aerosil R 805, 200 g to 250 g of mica and 100 g of ethanol.

The mixture is processed for at least 1 hour with slow addition of the isotropic carbon fibres via the dissolver or the three-roll mill.

The mixing ratio of component A to component B is 1.2:1 parts by weight.

The expansion-controlling effect of the restricting layer may be varied in different ways. This is done, for instance, by varying the base material of component A, (a), the weight proportion being adjusted between 70 and 30 parts by weight. With 30 parts by weight of (a) the "stabilizing filler" such as mica or Plastorit should be doubled.

In case of fire, the individual components will form a strongly adhering layer of carbon, mica and aerosil, which begins to fuse at a fire temperature of 900° C. and thereby restricts expansion, i.e., the thickness of the foaming-agent layer.

(b) the same effect may be achieved through the thickness of the restricting layer. The appropriate selection as to composition and thickness of the restricting layer has to be made for every case of use.

2. The primer retarding layer 4:
This layer has the following composition:
Comnonent A:
   (a) VE 4001 (epoxy resin composition A/F including novolak, made by Rütgerswerke AG): 45 parts by weight
   (b) MF 910 (melamine resin like 1st component A (b) of Hoechst AG): 2 parts by weight.
   (c) VVE (stabilizer of Rütergswerke AG): 2 parts by weight
   (d) water: 2 parts by weight
   (e) pentaerythrite: 18 parts by weight
   (f) Phoscheck P 30 or Exolit 462 (an Ammonium-polyphosphate of Hoechst AG): 18 parts by weight
   (g) Antiblaze 78 (chlorophosphoric ester of Mobil Oil AG): 11 parts by weight
   (h) titanium RD 2: 2 parts by weight
   (i) mica: 2 parts by weight
   (k) isotropic pitch-based carbon fibres: 5 parts by weight To 1 kg of this mixture there are further added 10 parts by weight of Aerosil R 805 and 50 parts by weight of mica, and as a diluent a mixture of 60 parts by weight of methylene chloride and 40 parts by weight of toluene is added.

Component B:
   (a) VE 4001 b (hardener of an amino adduct and polyamide amine of Rütgerswerke AG): 16 parts by weight
   (b) water: 2 parts by weight
   (c) Dicyandiamit EH (SKW Trostberg): 3.2 parts by weight
   (d) Aerosil R 805 (of Degussa AG): 0.4 parts by weight
   (e) isotropic pitch-based carbon fibres: 5 parts by weight The components A and B are mixed at a ratio of 4:1. For application by spraying only a small amount of the solvent composition is required, whereas for brush coating the specified amount must be used.

For good adhesion to the base 1 and for high strength in absorbing the load due to the upper foaming-agent layers, this primer layer 4 should be applied in two steps. An interval of at least 24 hours should elapse between the first and the second application.

3. Foaming-agent layers 3, 3a, 3b:
Comnonent A:
   (a) OS 98 (epoxy-novolak mixture including diluent S of Rütgerswerke AG): 44 parts by weight
   (b) Maprenal 980 (Hoechst AG): 4 parts by weight
   (c) MF 910 (melamine resin of Hoechst AG): 6 parts by weight
   (d) Exolit 454 (activated ammonium polyphosphate of Hoechst AG): 20 parts by weight
   (e) pentaerythrite: 15 parts by weight
   (f) mica: 4.5 parts by weight
   (g) titanium RD 2: 4.5 parts by weight (h) Antiblaze 78 (chlorophosphoric ester of Mobil Oil AG): 12 parts by weight
(i) isotropic pitch-based carbon fibres: 7.5 parts by weight To 1 kg of component A there are also added 35 parts by weight of Aerosil R 805 and 700 parts by weight of ethanol.

The proportion of ethanol may be increased or decreased according to external temperatures, depending on whether brush coating or spraying is to be used.

Component B:
(a) polyaminoamide: 85 parts by weight
(b) amine adduct: 10 parts by weight
(c) isotropic pitch-based carbon fibres: 5 parts by weight To 100 parts of this mixture there are also added 30 g of mica and 25 parts by weight of a further amine adduct.

This mixture is slowly stirred with dissolver into the other ingredients, advantageously with another 10 g of Aerosil R 805 or corresponding parts by weight of a Sylodex 24 or a bentone or bentonite. The material, which will expand when subjected to heat, is mixed at a ratio of component A to component B of 4:1.

In all of the examples, resins and hardeners of Rütgerswerke AG have been used; but these can be replaced, however, by products of other companies such as Bayer, Hoechst, Schering, Ciba-Geigy, Dow.

When applying the foaming-agent layers it is recommended to apply the individual layers rapidly upon each other. Especially the epoxy resins with the predetermined hardeners have a longer pot life, which is desirable e.g. for brush coating. Moreover it has been possible, however, to achieve excellent distribution of the expandable compositions by means of high-pressure machines and special spray guns having separate pressurized-air supply. Especially in the case of objects where running operations should not be interrupted, fast working must be ensured.

EXAMPLE 2

A fire-retarding laminated element according to the invention comprises the following layers:

1. A steel-plate 50×50×0.5 cm as a substrate is covered by an anticorrosive layer consisting of polyvinylbutyrol or an epoxy resin layer of 120 gram covering the substrate.
2. A primer restricting layer, as a S 3100 layer, consisting of the components A and B of example 1 in an amount of 400 grams.
3. A combined pair of foaming-agent layers S 3200 as shown by layer 3 of FIG. 1 consisting of the components A and B of example 1 in the amount of 400 grams for the one layer and 400 grams for the other layer is superimposed in order to get a greater thickness of 800 g of the combination. The first foaming-agent layer of 400 g is sprayed onto the primer retarding layer. As soon as the surface of this first foaming-agent layer is no longer tacky but formstable to retain uniform dimension the second foaming-agent layer is sprayed on it.
4. A further restricting layer S 3300 as shown in example 1 in the amount of 300 g is sprayed onto the dry surface of the second foaming-agent layer. All of the individual layers are sprayed or painted onto the substrate or onto the lower layer as soon as the lower layer is sufficiently dry but not yet hardened.

The steel-plate covered with the layers 2 through to 4 can be hardened in an oven at 60° C. This hardening can take between, 2 and 3 weeks. If the hardening is carried out at room-temperature, for instance in a building or off-shore the sheets are completely hardened after about 1-2 months. That means that it is unnecessary to wait until one layer is completely hardened before covering it with the next layer. A time of between 1 and 2 hours for drying one layer at least on the top thereof is sufficient for covering this layer by the next layer.

Up to now, there is no suitable accelerator for epoxy resins comprising amines. Surprisingly, it has been possible to find such an accelerator for the present system, which uses amines and, respectively, polyamides or amidoamines.

The accelerator concerned is a polymercaptane resin which is used in combination with the hardeners. The minimum mercaptane number should be 3.3, and the consistence should be about 15,000 milli Pasc (at 20° C.). The resin is a water-white, colourless liquid. The polymercaptanes react rapidly with the epoxy resins. The reactions take place in both thin and thick layers and will also start at low temperatures. An addition of 25-35% is possible without affecting the behavior, in special cases up to 75%, based on the overall amount, may even be used.

The specified method opens up a wide field of applications, because all difficult problems of an expandable material have been solved and the foam structure and height (layer thickness after expansion) are predetermined for each case of use. Any deviation from the set values is practically impossible, and a once set fire resistance is warranted right from the start. By virtue of the formulation it is also possible with the method to eliminate any uncertainties found so far when passing through the thermoplastic state of a resin, because the type of the combination of a material which when subjected to heat will substantially not expand or expand only slightly and a material which when subjected to heat is highly expandable, allows rapid passing through this state.

It is thereby possible to prevent the expanded-layer combination from slipping off the base or other layers, and a high degree of fire resistance is achieved which may last up to 120 min with counter-heating rather than about 60 minutes only.

The fire protecting times depend on the thickness of the coating. Generally fire protecting times of between 3 and 4 hours can be reached in case of free heat radiation. If the complete thickness of the coating is increased from about 2 to 6 mm to about 6 to 12 mm, a maximum time of about 4 hours can be reached. Surprisingly, a further increase of the total thickness of the coating does not provide an increase of the fire protecting time and fire protecting duration, respectively, On the contrary, the fire protecting time decreases if the total thickness is more than about 12 mm because of some instabilities after the foaming.

Fields of application are, for instance, steel construction units and other metal members; moreover also any kind of timber. The possibility of a good fire-retarding effect is evident both for interior and exterior applications such as petroleum plants or off-shore platforms. An important feature is the wide interchangeability of some of the components. It is also possible to employ the invention in military engineering.

What is claimed is:

1. A fire-retarding laminated element comprising at least one foaming-agent layer capable of expanding at high temperatures and at least one restricting layer disposed adjacent to said foaming-agent layer for restricting the expansion of said foaming-agent layer so that, after expanding, said foaming-agent layer has smaller pores than it would have after unrestrained expansion in the absence of said restricting layer; said restricting layer comprising fillers of fibrous, flake-like and/or platelet-like fibers of at least a carbon selected from the group consisting of pitchbased carbon, high tenacity (HT) carbon, high strain (HST) carbon, intermediate modulus (IM) carbon, pre-ox carbon and carbon black, and imparting a relatively stable structure to the combination formed of said layers after high temperature expansion of said layers, said layers having been prepared from epoxy resin based materials, and said restricting layer has a thickness of one to three times the thickness of said foaming-agent layer prior to heat induced expansion.

2. A laminated element as claimed in claim 1, characterized in that said fillers comprise fibers of isotropic pitchbased carbon.

3. A laminated element as claimed in claim 1, characterized in that said restricting layer contains at least 50% by weight of said fillers.

4. A laminated element as claimed in claim 1, characterized in that said filler fibers have a length of from 0.2 to 6 mm.

5. A laminated element as claimed in claim 1, characterized in that said foaming-agent layer has a thickness on the order of 0.5 to 3 mm, and said restricting layer has a thickness on the order of 1 to 2 mm.

6. A laminated element as claimed in claim 1, characterized in that said fillers are flake-like and further include material selected from the group consisting of mica, magnesium-potassium-aluminum silicate, talc-like intergrown blend of muscovite, chlorite, quartz, silicates, highly disperse pyrogenic silicic acid, aerosils, carbonates of magnesium, carbonates of calcium, oxides of magnesium and oxides of calcium.

7. A laminated element as claimed in claim 3, characterized in that said fillers further include fibre-like components in a proportion of more than 30% by weight having a length of from 0.2 to 6 mm, which fillers are of material selected from the group consisting of glass, silica, steel, boron, aromatic polyamides, aromatic diamines, arylene dicarboxylic acids, and arylene dicarboxylic aramides.

8. A laminated element as claimed in claim 1, characterized in that said epoxy resins are the reaction products resulting from reacting a constituent selected from the group consisting of hydrophilic epoxy resins and hydrous epoxy resin emulsions and/or novolacs.

9. A laminated element as claimed in claim 1, in which said layers are laminated to a base element, characterized in that the layers that are closer to said base element have greater thicknesses than the layers that are remote from said base element.

10. A laminated element as claimed in claim 1, in which said layers are laminated to a base element, characterized in that a restricting layer is located between said base element and a foaming-agent layer.

11. A laminated element as claimed in claim 1, characterized in that said foaming-agent layer includes carbon fibers and/or carbon flakes.

12. A method of preparing a fire-retarding laminated element as claimed in claim 1, characterized in that said fillers are slowly added to a mixture of the liquid products for forming the first component of a two-component restricting layer before mixing said first component with the second component for said restricting layer, and that the resulting mixture of said first and second components for forming said restricting layer, along with material for forming said foaming-agent layer are rapidly applied upon each other.

13. A method as claimed in claim 12, characterized in that said layers are sprayed and/or painted one upon the other immediately after the preceding layer is form stable.

* * * * *